H. LANGE.
GAS BURNER FOR COAL OVENS.
APPLICATION FILED MAR. 19, 1919.
1,306,917.
Patented June 17, 1919.
2 SHEETS—SHEET 1.
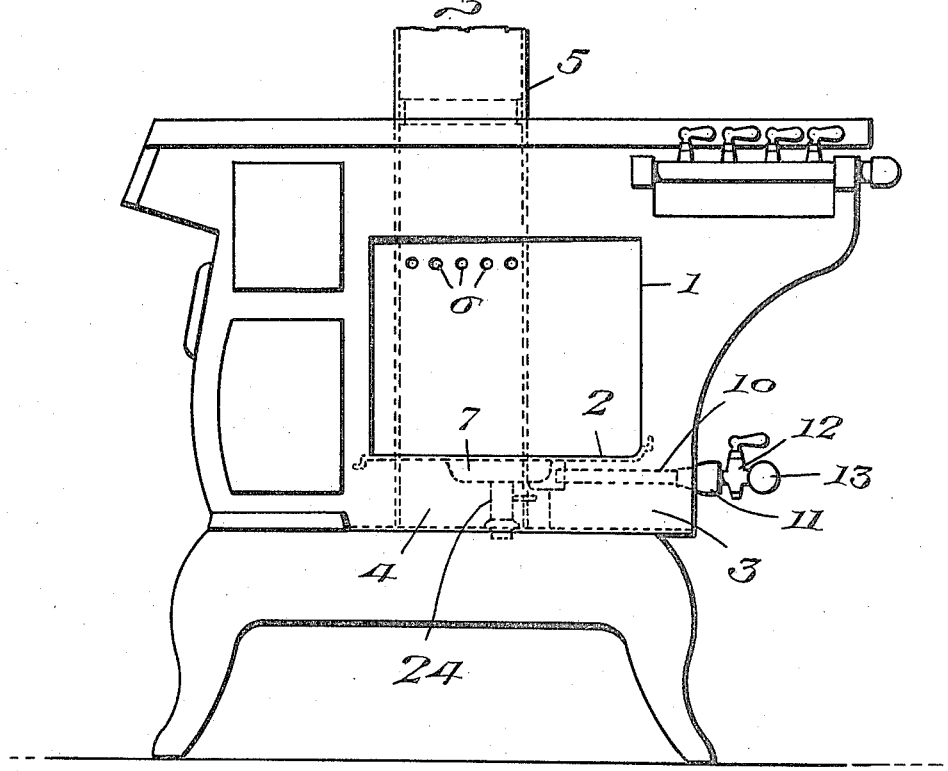
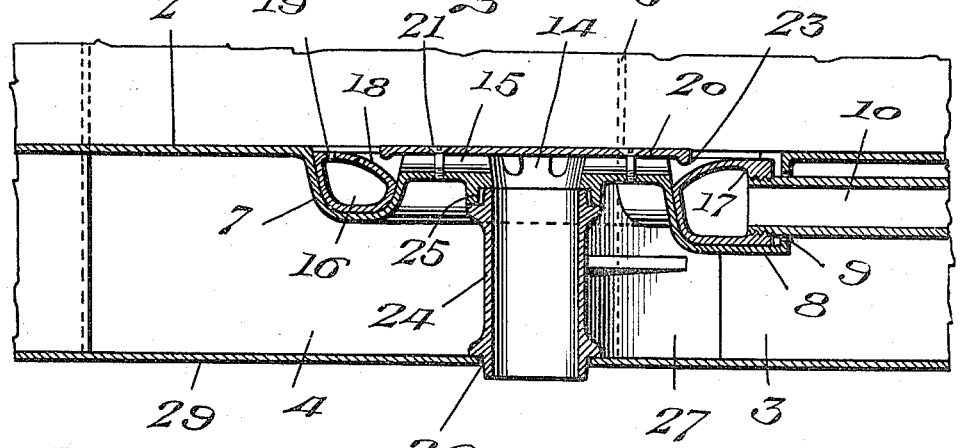
WITNESS:
Thos. W. Riley
INVENTOR.
Henry Lange
BY W. J. Fitz Gerald Co.
ATTORNEYS

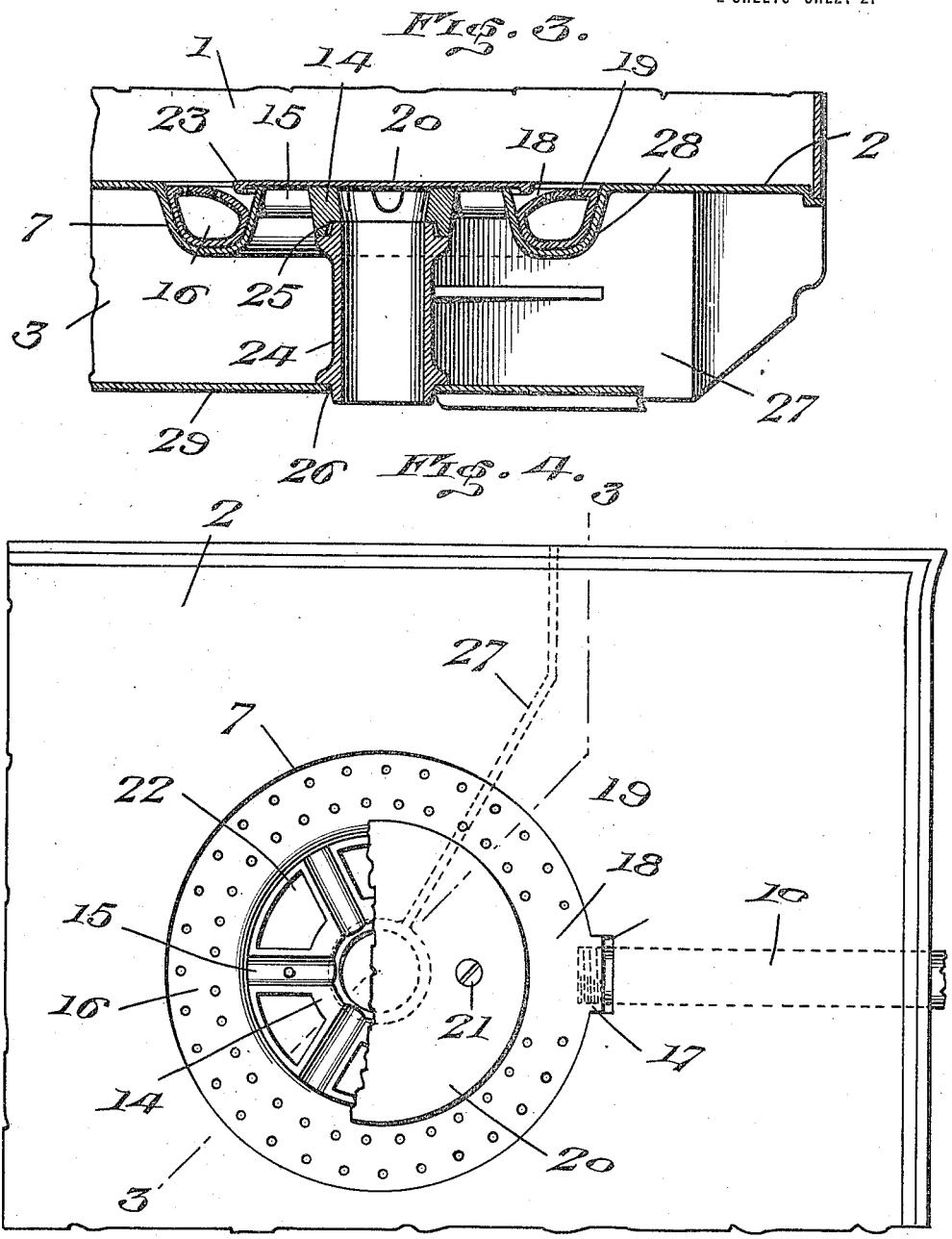

UNITED STATES PATENT OFFICE.

HENRY LANGE, OF QUINCY, ILLINOIS.

GAS-BURNER FOR COAL-OVENS.

1,306,917.      Specification of Letters Patent.      Patented June 17, 1919.

Application filed March 19, 1919. Serial No. 283,482.

*To all whom it may concern:*

Be it known that I, HENRY LANGE, a citizen of the United States, residing at Quincy, in the county of Adams and State of Illinois, have invented certain new and useful Improvements in Gas-Burners for Coal-Ovens; and I do hereby declare the following to be a full, clear, and exact description of the invention, such as will enable others skilled in the art to which it appertains to make and use the same.

The present invention relates generally to stoves, and more especially to ovens, it being the primary object of the invention to provide a gas burner to be used in the bottom of the oven of a coal stove or range, in order that either coal or gas can be used for heating the oven.

The object of the invention is the provision of a gas burner assembled with the oven bottom in a novel and improved yet simple and effective manner in order that perfect heating will result when using either coal or gas as fuel, the construction and arrangement of parts being such that the oven bottom will be effectively heated when coal is used, so as to avoid irregular heating or baking of an object on the oven bottom over the burner.

It has been found in practice, that stoves or ranges of this general character, having gas burners at the bottoms of the ovens, result in imperfect heating or baking, due to the fact that the provision of air inlet means for the burner, results in the air cooling a portion of the oven bottom, when coal is used as fuel, so that a pan resting on the oven over the burner, will result in a spot being produced on the article over the burner, due to imperfect heating. Thus, the chilled or cooled portion over which the pan rests, will chill the article in the pan over the cool portion of the bottom, thus resulting in slow baking or heating over this point, leaving a white or light spot on the article. This objection is overcome by the present improvements which permit the products of combustion to pass under the oven to heat the pan within the outline of the burner.

A further object is the provision of an oven bottom having a recess or depression for the gas burner, and means within the burner for transmitting the heat from the products of combustion to the bottom portion of the oven surrounded by the burner, to heat the oven bottom substantially uniformly over and adjacent to the burner.

A still further object is the provision of such a burner having novel means for distributing the air to the burner in an effective manner so as to afford perfect combustion and to avoid the flow of unheated air into the oven.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a front view of a coal stove or range, showing the oven door removed, and the gas burner in dotted lines.

Fig. 2 is an enlarged longitudinal vertical section through the oven bottom and burner.

Fig. 3 is a section on the line 3—3 of Fig. 4.

Fig. 4 is a plan view of the oven bottom showing the burner, a portion of the cover plate being broken away.

A conventional form of stove or range is shown in the drawings, having the usual oven 1 provided with the bottom 2 under which the flue 3 extends for the passage of the products of combustion around the oven and underneath same to the outlet 4 leading to the outlet flue or pipe 5. In using gas for heating the oven, the back wall of the oven 1 is provided with ventilating openings 6 near the top of the oven leading to the flue or pipe 5, thereby permitting the products of combustion from the burner to pass off to the chimney.

In carrying out the invention, the oven bottom 2, which is preferably a cast plate, is provided with an annular recess or depression 7, and, as shown, this recess is enlarged at one point, as at 8, and provided with a side opening 9 for the entrance of the gas mixing tube or pipe 10. This pipe 10 extends through the flue 3 and side wall of the stove and is provided at its outer end with an air mixer 11 and controlling valve 12 connected to the gas supply pipe 13. The oven bottom is provided within the annular recess or trough 7 with spider having the central hub or boss 14 with an opening therein, and the radial channeled arms 15 connecting the inner wall of the recess 7 and the boss 14, and the upper flues or channels of said arms communicate at their inner ends with the opening of the boss and at their outer ends with the annular channel of the recess 7.

The gas burner 16 is of annular form to seat within the recess 7, and is hollow, being provided at one point with a boss 17 within the enlarged portion 8 of the recess for the connection of the mixing tube 10, to supply the gas into the chamber of the burner. The top 18 of the burner slopes inwardly on a curved line, and is provided with gas outlet apertures 19. This burner is slightly below the surface of the oven bottom so as not to present an obstruction in the oven.

A cover plate or disk 20 is seated on the spider and is fastened down by means of screws 21 or the like extending downwardly through the plate 20 and threadedly engaging the spider, as seen in Fig. 2. This plate 20 covers the opening of the boss 14, the channels of the arms 15, and also the openings 22 between the arms of the spider. The plate 20 is flush with the oven bottom and constitutes a part thereof, with the burner located below the annular space between the plate 20 and edge of the oven bottom at the outer wall of the recess 7. By the provision of the spider having the openings 22 extending to the plate 20, the products of combustion, when coal is used as fuel, can pass upwardly within the spider to contact with the plate 20, thus keeping said plate heated, the same as the oven bottom 2, so that an object placed on the oven bottom over the burner will be heated substantially uniformly throughout its area. Thus, even though the provision of the fresh air inlet under the burner is made, the plate 20 will be heated when coal is used, to avoid a cold spot in the oven bottom within the oven burner, as is an objectionable feature to structures of this general kind heretofore used. The plate 20 also acts as a baffle for the inflowing fresh air, deflecting the same to flow radially from the opening of the boss 14 through the channels 15 to the burner, and in this connection the margin or edge portion of the plate 20 extends beyond and overhangs the inner wall of the recess 7 and inner portion of the burner 16, thus directing the air against and outwardly across the top of the burner to the apertures 19, providing for a perfect mixture of the air with the flames or jets. As shown, the edge of the plate 20 has a lower bead 23 over the sloping surface of the gas burner, to direct the air against said sloping surface in order that it will be forced outwardly to the apertures 19, instead of escaping upwardly past the edge of the plate.

Fresh air is admitted by way of a vertical air tube 24 within the flue 3 having a slip connection 25 with the boss 14, and having its lower end extending through an opening 26 provided in the bottom 29 of the stove. As will be apparent, fresh air can therefore flow upwardly through the tube 24 to pass through the channels 15 to the burner.

The tube 24 is cast integral with a partition or baffle 27 extending rearwardly to the back wall of the stove, to compel the products of combustion within the flue 3 to flow forwardly around the tube 24 before passing through the outlet 4, thus uniformly heating the oven bottom throughout its area. The upper and lower edges of the partition 27 are shaped to fit the oven bottom 2 and stove bottom 29, the upper edge being recessed, as at 28, to fit under the depressed portion or recess 7 and spider.

With the present construction as illustrated and described, the oven can be heated effectively both with the use of coal and gas, and objections incident to burners heretofore used are overcome. It will also be noted that the plate 20 in overhanging the burner 16, will prevent it from being lifted out of the recess 7, and the bead 23 will serve to distribute the air along the edge of the plate from the outer ends of the channels, 15. By unscrewing the mixing tube 10 from the burner, and removing the plate 20, the burner can be readily lifted from the oven bottom, for purpose of cleaning, repair or replacement. It is also to be noted that the recess 7 and spider are cast integral with the oven bottom 2, and the burner 16, plate 20 and tube 24 with its partition 27 are readily cast from metal, thus providing a simple construction which can be easily manufactured and assembled.

Having thus described the invention, what is claimed as new is:—

1. An oven bottom having an opening, a plate over said opening substantially flush with the bottom, a gas burner located between said plate and bottom, and means for the entrance of air upwardly to and along the under side of said plate to the burner, said opening exposing said plate to the products of combustion under the oven bottom to be heated thereby.

2. An oven bottom having a recess and a spider therein provided with air inlet means, a burner within the recess, and a cover plate on said spider exposed therethrough for the contact of products of combustion under the oven bottom.

3. An oven bottom having an annular recess and a spider therein, an annular gas burner in said recess, said spider having an air inlet and channels leading radially therefrom to the inner wall of said recess.

4. An oven bottom having an annular recess and a spider therein, having an air inlet and radial channels leading from said inlet to said recess, an annular gas burner in said recess, and a cover plate on the spider exposed through the openings between the arms thereof to products of combustion under the oven bottom.

5. An oven bottom having an annular recess and a spider therein having a central air inlet opening and radial air channels leading from said opening to said recess, an annular gas burner in said recess, and a cover plate secured on the spider over said opening and channels to deflect the air to the burner, said plate being exposed through the openings of the spider between the arms thereof to products of combustion under the oven bottom.

6. An oven bottom having an annular recess and a spider therein provided with a central air inlet opening and radial channels leading from said opening through the inner wall of the recess, an annular gas burner within said recess, and a cover plate secured on the spider over said opening and channels and exposed through the openings of the spider between the arms thereof to products of combustion under the oven bottom, the edge of said plate projecting beyond the spider to overhang the inner wall of the recess and burner.

7. A stove or range having an oven therein, the bottom of which is provided with an annular recess and a spider therein having a central air inlet opening and air channels leading radially therefrom to said recess, an annular gas burner within the recess, and an air inlet tube having its upper end engaging said spider in communication with said opening and its lower end opening through the bottom of the stove, said tube having a partition extending between the bottoms of the oven and stove and fitting under said spider and recess.

8. An oven bottom having an annular recess and an opening surrounded by said recess, an annular gas burner within said recess, a plate over said opening substantially flush with the oven bottom, and means for the entrance of air upwardly to and along the under side of said plate to said recess and burner.

9. An oven bottom having an annular recess and an opening surrounded by said recess, an annular gas burner within said recess, a plate over said opening substantially flush with the oven bottom and having its edge overhanging said burner, and means for the entrance of air upwardly to and along the under side of said plate into said recess over the burner, said opening exposing said plate to products of combustion under the oven bottom to be heated thereby.

In testimony whereof I have signed my name to this specification in the presence of two subscribing witnesses.

HENRY LANGE.

Witnesses:
   A. H. STORK,
   ED SCHMUCK.